Aug. 26, 1969  S. M. BROADWIN  3,463,000
METHOD FOR TESTING MOISTURE CONTENT OF A PRODUCT
Filed Aug. 1, 1967
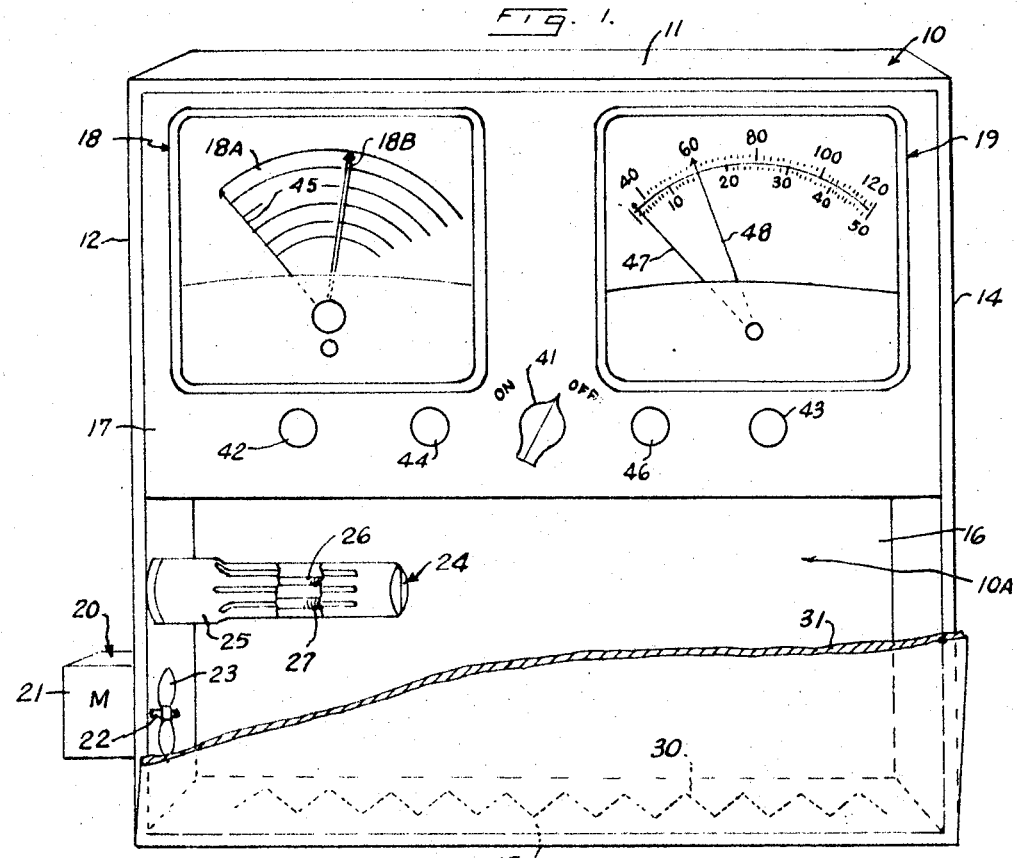
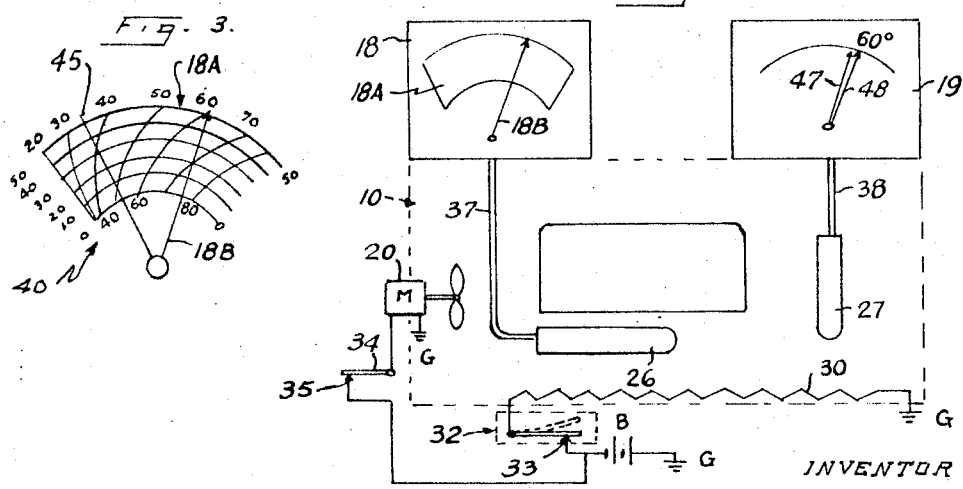
INVENTOR
SAMUEL M. BROADWIN
BY
*Howard T. Jeandron*
AGENT ns patent content content.

United States Patent Office 3,463,000
Patented Aug. 26, 1969

3,463,000
METHOD FOR TESTING MOISTURE CONTENT OF A PRODUCT
Samuel M. Broadwin, 60 E. 8th St., New York, N.Y. 10003
Filed Aug. 1, 1967, Ser. No. 657,675
Int. Cl. G01n 25/56, 5/02
U.S. Cl. 73—76        9 Claims

ABSTRACT OF THE DISCLOSURE

A method and apparatus for determining the relative humidity of a sample product that is produced as a multiple of the tested product, wherein the tested sample provides the measure of water vapor present in the product expressed in percentage of vapor by weight at given temperatures and the RH at each rising temperature is indicated to form a duly plotted reference curve for that product. This curve is used as a multiple humidity scale. With a hermetically sealed test chamber, any sample of the multiple product may be quickly and easily tested for its RH by setting the test chamber at a predetermined temperature and establishing an equilibrium of the humidity and temperature between the product and the air in the test chamber. The RH should agree with the RH established on the multiple humidity scale.

---

This invention relates to a method and apparatus for ascertaining the indicated moisture content of any product that is produced as a multiple similar product to provide a simple, rapid and convenient on the spot test.

The present known apparatus and method for determining moisture content of various products are complicated, slow, inconvenient and not on the spot, for example, in the baking industry, the law requires a fixed amount or percentage of moisture in a loaf of bread. They cannot test each loaf of bread, so one loaf is tested for moisture content. The present method of testing takes 24 hours, but the loaf of bread sampled and all other similar loaves are baked, delivered and sold in a span of eight hours. All loaves may not be similar in every respect and no actual control is maintained. Any variation over the prescribed percentage of moisture may subject the baker to fines.

The prior art as exemplified in Patent No. 2,918,815 shows a method of estimating the moisture content of tobacco, this is one product and the method is based on determining the RH at the ambient temperature. The tobacco sample is placed in a chamber and at ambient temperature, the air is circulated to bring the air and tobacco into a moisture equilibrium. A relative humidity instrument is used to determine the RH within said chamber. The resulting RH may be a given percentage, but the moisture content will vary with change in temperature. Also, although only tobacco is being tested, if other products are similarly tested in the same chamber, the moisture content will vary with different products. The cited patent does not determine RH percentage based on moisture content by weight but rather on a moisture equilibrium of the tobacco and the surrounding air in the test chamber.

It is an object of this invention to provide a test chamber in which the temperature may be varied and any product for multiple reproduction may be checked to indicate its moisture content by weight and percent RH has been established for that product.

It is a further object of this invention to provide a means of varying the baking time of a product to bring the product to a desired moisture content when the percentage of RH has been established for that product.

It is a further object to provide the percentage of RH of any product at any temperature so that all subsequent multiple similar products may be quickly and conveniently tested on the spot for their moisture content.

It is a further object of this invention to provide a moisture control of other products to determine a desired moisture content for applying paint, coatings, etc.

It is a further object of this invention to establish a moisture content by weight in comparison with the percent RH to establish an equivalent curve for various products so that a plurality of subsequent tests for moisture content of any of the various products may be rapidly completed.

It is a further object of this invention to provide the means to compare an unknown sample of any product with an ideal sample of that product to ascertain the moisture content.

It is a further object to proportionally control the moisture content of a product during its manufacture by maintaining a record of the percentage RH and proportionally applying heat to drive off moisture from the product as called for by the recorder.

It is a further object of this invention to establish the moisture content by weight for various products at a predetermined temperature higher than ambient temperature.

It is a further object of this invention to provide the percentage of RH of any product by a fixed temperature method where the test temperature is set and the percent RH is correlated to that fixed temperature.

It is a further object of this invention to provide a method of reducing the calculation for establishing the moisture content by weight vs. percent relative humidity for a specific product by establishing an equivalent curve to give an immediate indication.

Other objects of this invention shall be apparent by reference to the accompanying detailed description and the drawings in which FIG. 1 is a front elevational view of the RH testing instrument, FIG. 2 is a schematic of the component elements used in this instrument, and FIG. 3 shows a comparative scale for percentage RH at varying temperature.

Referring to the drawing and particularly FIG. 1 there is illustrated a cabinet 10 having a chamber 10A formed with a top 11, sides 12 and 14 and a bottom 15 and a closed back panel 16. The upper portion of cabinet 10 is provided with an instrument panel 17 in which the indicating meters 18 and 19 are mounted as well as the attached accessories. A fan 20 is mounted in the one side wall 12 with its motor 21 on the exterior and a shaft 22 extending through the side 12 and a fan 23 mounted on shaft 22 within the cabinet. Indicating probe 24 is also hung within the lower portion of the cabinet. The indicating probe comprises a thermistor 26 and a humidity transducer 27 enclosed within a housing 25, the housing 25 being perforated or open to the atmosphere within the cabinet. The transducer 27 is an electrically actuated instrument to record the relative humidity of the air surrounding said instrument. This may be of any known and suitable form as now sold in the open market. The thermometer 26 may be any type such as a thermistor or the type connected by a hollow tube filled with a fluid to indicate on the meter 19, the temperature surrounding the thermometer probe 27. Mounted within the base or bottom 15 is a heating coil 30 and to permit hermetically sealing the cabinet 10, there is provided a door 31 which may be hinged to the bottom 15 on the front face to enclose the entire lower front open area of the cabinet in a tightly hermetically sealed relationship.

Referring to FIG. 2 there is schematically illustrated the components which illustrate the use of the cabinet 10. The heating element 30 is connected to a ground G on one side and to a thermostatic switch 32 on the opposite side, switch 32 being connected to a contact 33 when closed. Contact 33 being in turn connected to a battery B and on the opposite side to ground G. Thus the heater 30 may be used at will to produce the desired temperature within cabinet 10 as shown by the thermostat 32 which may be set at a desired temperature. The fan 20 is similarly connected on one side to a ground G, on the other side to a switch 34, switch 34 in its closed position contacting 35, contact 35 being connected to battery B and on its opposite side to a ground G. The probe or thermometer 26 is positioned within the lower compartment of cabinet 10 and the transducer 27 is also positioned within the lower compartment of cabinet 10. The transducer 26 is connected by a line 37 to the meter 18 while the thermometer 27 is connected by line 38 to the meter 19. With these components, any product that is to be tested for its moisture content (for example a loaf of bread) may be placed within the lower compartment of cabinet 10 and the door 31 tightly closed. With the temperature regulated switch 32 closed, the heating element is energized to raise the temperature within the cabinet to a desired temperature at which time switch 32 cuts out and the temperature will be indicated on the meter 19. The switch 34 is also closed to energize motor 20 and activate the fan to circulate the air within the compartment of the cabinet so that the air circulates about the product to be tested.

When the temperature setting has been attained, switch 32 being an automatic switch will allow the setting for a desired temperature and provide an automatic opening and closing to maintain the desired temperature. After the fan has operated at this temperature, it will provide a circulation of the air within the cabinet so that the air will absorb moisture from the product and the air will thus be in equilibrium with the product in temperature and in relative humidity. At this time, meter 18 will provide a reading on the scale 18A which is a dually plotted scale to indicate the percentage of relative humidity at predetermined temperatures. Therefore with a reading of the meter 19 indicating the temperature (for example 60° C.) of this test, referring to the scale 18A, the plotted curve of 60° will intersect a plotted curve with the needle 18B. This plotted curve is defined as a percentage relative humidity (for example 50%). If the product, for example, the loaf of bread, is an ideal sample having the desired moisture content, all subsequent loaves of bread that the identical may be tested in repeat fashion by inserting in the cabinet bringing the interior air into equilibrium with the product and checking the temperature and relative reading to determine whether the identical products are being maintained at the prescribed moisture content.

It is known that different products have a different moisture vapor pressure at a prescribed temperature and also any one product varies considerably at different temperatures. For example, a loaf of bread taken one day from one batch at a prescribed temperature has a certain vapor pressure while a loaf of bread taken another day from a different batch at the same temperature may show a different vapor pressure. In this particular industry the law requires that the moisture content of white bread must be of no more than 38%. Any deviation more than this amount is subject to fine. It is also to be noted that the percentage of relative humidity of different products varies. For example:

TABLE OF HUMIDITY EQUILIBRIUM

| Relative humidity, percent | Percentage of absolute moisture | | |
|---|---|---|---|
| | Wheat flour | Wool | Tobacco |
| 20 | 6.5 | 7.8 | 6.8 |
| 30 | 8.7 | 10.0 | 7.8 |
| 40 | 10.0 | 10.5 | 9.0 |
| 50 | 12.2 | 14.0 | 10.2 |

The percentage relative humidity is expressed by water content, by weight, that is, for a particular product such as tobacco, the product is weighed and the moisture content is determined as the relative humidity as shown in the above table. If the temperature is varied, the relative humidity will also vary showing a changing moisture content.

Referring to FIG. 3 the graph 40 provided for the meter 18 is comprised of a plurality of arcs indicating a gradation of temperature, for example, from 0 to 50°. On this graph the relative humidity from 20% to 100% is plotted to establish a moisture equivalent curve for each percent of relative humidity, that is, for 50% relative humidity, the plotted curve will start with 1° of temperature rising to 50° of temperature as shown on the graph 40.

Referring to FIG. 1 there is also illustrated the controls for operation of this cabinet. The main switch 41 may combine 34 and 32 to be closed and allow switch 32 to act automatically at a chosen temperature. A switch 42 is an on off switch to energize meter 18 in response to the transducer 26. Switch 43 is an on off switch to energize meter 19 in response to the thermometer 27. An adjusting knob 44 may be connected to an auxiliary needle 45. This permits setting the needle at a desired relative humidity for a particular termperature. Similiarly there is an adjusting knob 46 connected to an auxiliary needle 47 so that needle 47 may be set at a desired temperature for the particular test. Thus when the indicator switch 43 is turned on, the temperature should be maintained, that is, needle 48 should parallel needle 47. The graph shown in FIG. 3 may vary according to the product chosen. In each case the moisture equivalent curves on the graph must be determined by testing samples of the product for their moisture content by weight. Having established this graph, all similar products thereafter may be quickly and easily tested for their moisture content.

A further embodiment of this invention is to provide the same components for testing the surface of various products to determine the moisture content such as in painting or coating the product. One form of such a device would be the same cabinet 10 with a heater 30 in the back of the cabinet and only the bottom of the cabinet open so that the cabinet may be placed upon any surface and the components utilized as already described bringing the air within the cabinet into an equilibrium with the surface upon which the cabinet rests and thus reading the relative humidity at a desired temperature. This would provide an exact control to determine whether a surface was dry enough for painting or plating or coating with various types of coating. The moisture content expressed throughout refers to free moisture not $H_2O$ as part of a chemical combination or bond.

Although we have described a particular form of cabinet for testing relative humidity or in essence the moisture content of various products, the cabinet may vary in its configuration or the complete device may be adapted to any device where the ambient temperature or controlled temperature and surrounding air can be brought into equilibrium with the product and although a particular combination of components are illustrated, the temperature may be determined by any known temperature means, the heat may be maintained by any known temperature source and although a fan 23 has been illustrated, any means of circulating the air within the cabinet to produce an equilibrium within the cabinet may be utilized without departing from the spirit of this invention and this invention shall be limited only by the appended claims.

What is claimed is:

1. A method of quickly but accurately determining the moisture content of a sample of a quantity production of a product comprising, first obtaining a reference humidity curve as a multiple humidity scale with an untreated humid sample of said product, by weighing said product at ambient temperature to record a starting point for said humidity curve then drying said product in a hermetically sealed enclosure by raising the temperature to a predetermined degree and again weighing said product and recording the RH on said humidity curve, repeating the increase of temperature and weighing and recording each RH at each raised temperature until the limit of temperature and weight indicate the product is dry without moisture content, secondly placing any similar sample from said quantity production of the product with an unknown RH in a hermetically sealed test chamber and heating and circulating the air in said test chamber to establish an equilibrium between said product and the air in said test chamber and reading the RH at a selected temperature and comparing the RH reading with said reference humidity curve to determine that said sample with an unknown RH is conforming to the established RH for that product at that selected temperature.

2. In a method according to claim 1 in which the moisture content by weight is established for each product at a fixed temperature.

3. In a method according to claim 1 in which the moisture content by weight is established for each product at a different temperature.

4. In a method according to claim 1 in which the percentage of relative humidity of any product may be indicated by a fixed temperature method where the test temperature is fixed and the percentage of relative humidity is correlated to that fixed temperature.

5. In a method according to claim 1 in which the percentage of relative humidity of any product may be indicated by a multiple humidity scale where the test temperature differs for the same quantity of moisture vapor.

6. In a method according to claim 1 in which the moisture content by weight is established at any temperature without calculations.

7. In a method according to claim 1 means to indicate RH in comparison with moisture content of any product in which moisture is present.

8. In a method according to claim 1 in which a sample of the same product with unknown weight may be tested by reference to the equivalent curve for that product to provide an immediate indication of the moisture content.

9. A method according to claim 1 in which the first step is starting with a wet sample, weighing for moisture content, determining the RH at different predetermined temperatures, removing a portion of the moisture and weighing to determine the RH of the product and repeating until the sample is dry.

References Cited

UNITED STATES PATENTS 2,918,815   12/1959   Lewis _____ 73—73

RICHARD C. QUEISSER, Primary Examiner

C. E. PHILLIPS, Assistant Examiner